(12) United States Patent
Bi

(10) Patent No.: US 9,445,394 B2
(45) Date of Patent: *Sep. 13, 2016

(54) AUTOMATIC RESPONSE TO LOCALIZED INPUT

(71) Applicant: AT&T Intellectual Property I, L.P., Atlanta, GA (US)

(72) Inventor: Haifeng Bi, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,266

(22) Filed: Oct. 16, 2014

(65) Prior Publication Data

US 2015/0038176 A1 Feb. 5, 2015

Related U.S. Application Data

(63) Continuation of application No. 13/097,349, filed on Apr. 29, 2011, now Pat. No. 8,892,082.

(51) Int. Cl.
*H04M 3/42* (2006.01)
*H04W 68/02* (2009.01)
*H04W 48/04* (2009.01)
*H04W 4/02* (2009.01)
*H04W 64/00* (2009.01)
*H04W 88/08* (2009.01)
*H04W 84/04* (2009.01)

(52) U.S. Cl.
CPC ............. *H04W 68/02* (2013.01); *H04W 4/02* (2013.01); *H04W 48/04* (2013.01); *H04W 64/00* (2013.01); *H04W 88/08* (2013.01); *H04W 84/045* (2013.01)

(58) Field of Classification Search
CPC .......................... H04W 48/04; H04W 84/045
USPC ........... 370/395.2, 310; 455/435.1, 411, 415, 455/456.3; 726/3, 2
See application file for complete search history.

(56) References Cited

U.S. PATENT DOCUMENTS

| 6,169,494 | B1 | 1/2001 | Lopes | |
|---|---|---|---|---|
| 7,015,817 | B2* | 3/2006 | Copley et al. | ............. 340/573.4 |
| 2004/0185875 | A1 | 9/2004 | Diacakis et al. | |
| 2006/0030333 | A1 | 2/2006 | Ward | |
| 2007/0183427 | A1* | 8/2007 | Nylander et al. | .......... 370/395.2 |
| 2007/0293240 | A1* | 12/2007 | Drennan | ................... 455/456.1 |

(Continued)

OTHER PUBLICATIONS

Office action dated Feb. 4, 2014 for U.S. Appl. No. 13/097,349, 22 pages.

(Continued)

*Primary Examiner* — Charles Shedrick
(74) *Attorney, Agent, or Firm* — Amin, Turocy & Watson, LLP

(57) ABSTRACT

Automatic response to localized input is provided. Where a first user equipment enters a service area, the presence of the first user equipment can be determined from an identification information. The identification information can be employed to access information relating to the identification information. Where either the identification information or the information associated with the identification information satisfy one or more predetermined rules, a response can be determined. The determined response can be made accessible. As such, a second user equipment can receive the response based, at least in part, on the first user equipment entering the service area.

20 Claims, 12 Drawing Sheets

(56) References Cited

U.S. PATENT DOCUMENTS

| | | | |
|---|---|---|---|
| 2008/0072284 A1* | 3/2008 | Horvitz et al. | 726/2 |
| 2009/0094680 A1* | 4/2009 | Gupta et al. | 726/3 |
| 2009/0098871 A1* | 4/2009 | Gogic | 455/435.1 |
| 2009/0288145 A1* | 11/2009 | Huber et al. | 726/3 |
| 2010/0090827 A1* | 4/2010 | Gehrke et al. | 340/539.13 |
| 2010/0110945 A1* | 5/2010 | Koskela et al. | 370/310 |
| 2010/0113020 A1* | 5/2010 | Subramanian et al. | 455/435.2 |
| 2010/0197307 A1* | 8/2010 | Horn et al. | 455/435.1 |
| 2011/0010543 A1* | 1/2011 | Schmidt et al. | 713/168 |
| 2011/0223912 A1* | 9/2011 | Nasielski et al. | 455/435.1 |
| 2011/0237227 A1 | 9/2011 | Kemery et al. | |
| 2012/0129497 A1* | 5/2012 | De Benedittis et al. | 455/411 |

OTHER PUBLICATIONS

Office action dated Aug. 8, 2013 for U.S. Appl. No. 13/097,349, 17 pages.

Office action dated Feb. 13, 2013 for U.S. Appl. No. 13/097,349, 14 pages.

Office action dated Aug. 1, 2012 for U.S. Appl. No. 13/097,349, 13 pages.

* cited by examiner

AUTOMATIC RESPONSE TO LOCALIZED INPUT

CROSS-REFERENCE TO RELATED APPLICATIONS

This application is a continuation of, and claims priority to, U.S. patent application Ser. No. 13/097,349 (now U.S. Pat. No. 8,892,082), filed on 29 Apr. 2011, and entitled "AUTOMATIC RESPONSE TO LOCALIZED INPUT," the entirety of which is incorporated herein by reference.

TECHNICAL FIELD

The disclosed subject matter relates to mobile devices and networks and more particularly to proximity notification in response to the position of a mobile device in a mobile network.

BACKGROUND

Technologies that use global position system (GPS) to detect the presence of mobile device in a much broader geographic area can require GPS components in the mobile device. These GPS components can increase the cost of the mobile device making it less accessible to consumers. Further, the GPS components can consume additional power lessening the useable time of the device between charges. Moreover, GPS systems can be associated with granularity that may be insufficient to easily identify a location with sufficient accuracy, especially in vertical construction. For example, a GPS can have difficulty determining if a cell phone is on the $3^{rd}$ floor or $4^{th}$ floor of an office building.

The above-described deficiencies of conventional presence detection systems are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In contrast to GPS enabled systems, employing localized access points to respond to the proximity of a mobile device can offer numerous advantages as will be appreciated from the subject disclosure. Automatic response to localized input can include a localized access point receiving an indicator from a proximate mobile device. The indicator can be employed in determining a response to the proximate presence of the mobile device.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the drawings.

DETAILED DESCRIPTION

Figure 1:
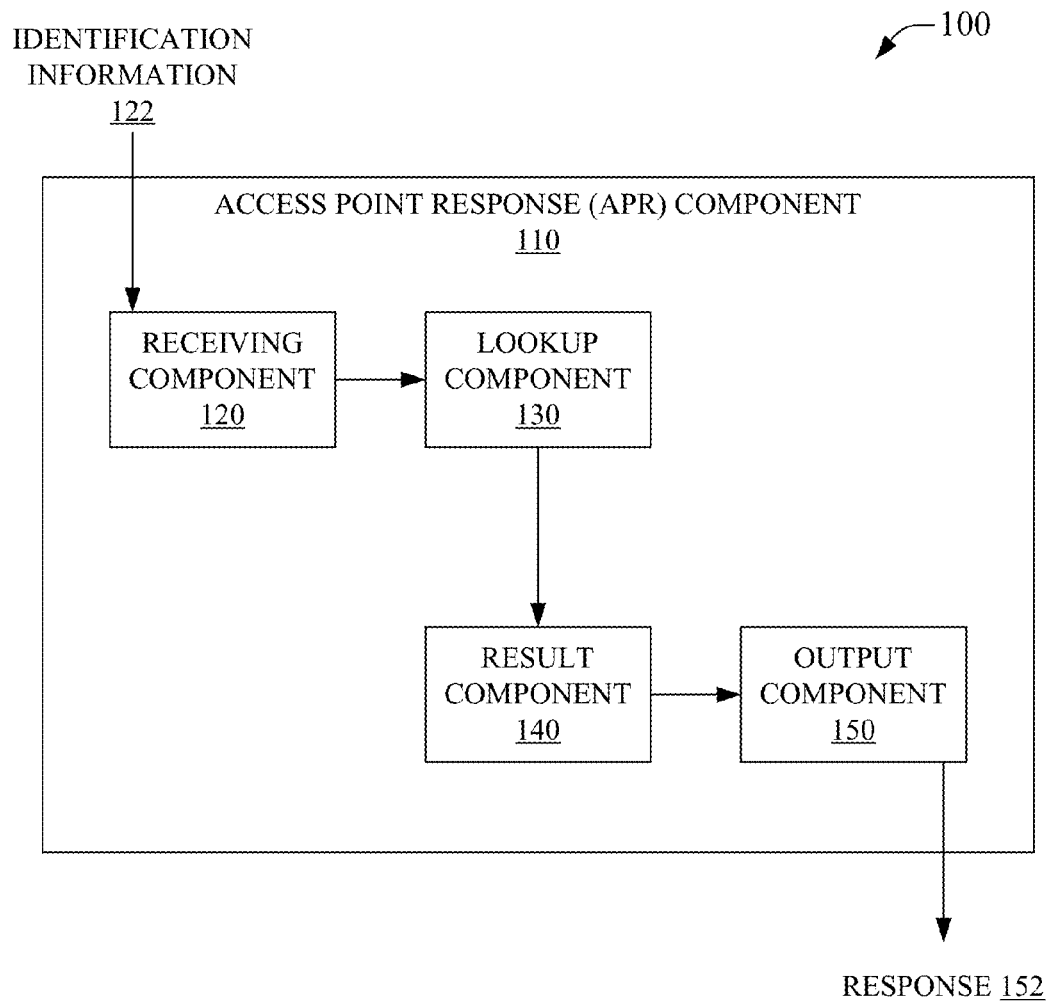
FIG. 1 is an illustration of a system that facilitates access to an automatic response to a localized input in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, that facilitates access to an automatic response to a localized input in accordance with aspects of the subject disclosure. System 100 can include access point response (APR) component 110 that can receive identification information (IDI) 122 from a mobile device, such as a cell phone, pager, smartphone, tablet computer, laptop computer, vehicle, etc. Identification information can include nearly any type of identifier, such as a subscriber identity module (SIM) identifier, an electronic SIM (eSIM) identifier, an internet protocol (IP) address, a Media Access Control (MAC) address, a phone number, a password, a user id, e.g., a user identifier to log into a computer system, a website, a service, etc., a personal identification number (PIN), etc. Numerous other examples are not explicitly recited for brevity but are to be considered within the scope of the present disclosure.

APR component 110 can include a receiving component 120. Receiving component 120 can be configured to receive IDI 122. Receiving component 120 can be communicatively coupled to lookup component 130. Lookup component 130 can be configured to receive information related to IDI 122. As a non-limiting example, lookup component 130 can receive an account owner identification associated with a received SIM identifier (e.g., IDI 122). In some embodiments, lookup component 130 can access information related to an IDI 122 from a local, remote, or distributed data store.

APR component 110 can further include result component 140. Result component 140 can be communicatively coupled to lookup component 130. Result component 140 can automatically determine a response 152 to a received IDI 122. This automatically determined response 152 can be based on the IDI 122 itself or can be based on the information associated with the IDI 122, such as the information received by lookup component 130. Result component 140 can be communicatively coupled to output component 150. Output component 150 can be configured to facilitate access to an automatically determined response 152 from result component 140.

As a non-limiting example of system 100, APR component 110 can receive a SIM identifier (e.g., IDI 122) from a tablet computer within a predefined proximity to receiving component 120. The SIM identifier (e.g., IDI 122) can be communicated to lookup component 130 that can receive the name of the owner of the tablet computer associated with the SIM identifier (e.g., IDI 122) from a query of a subscriber agreement for the tablet computer. The name of the owner can be communicated to result component 140. Result component 140 can automatically determine that the name of the owner can be emailed to the owner of the premises in which receiving component 120 is located (e.g., response 152). This automatically determined response 152 can be communicated to output component 150. Output component 150 can facilitate generating a preformatted email and inserting the name of the owner of the tablet computer. The email (e.g., response 152) can then be sent to the owner of the premises in which receiving component 120 is located. It is to be noted that this non-limiting example is presented merely to illustrate some aspects of the disclosed subject matter and should not be construed to limit the subject disclosure in any way.

As a further non-limiting example of system 100, an APR component 110 can have a service area approximating the region occupied by a dwelling. Where the APR component 110 is located in Homeowner's home and Homeowner has a teenage child that carries a mobile phone, when the child's mobile phone enters the APR service area a response (e.g., response 152) can automatically be generated by the system to notify Homeowner that the child's phone has entered the APR service area. This can be, for example, by sending Homeowner a text message with the notification. Similarly, where the child leaves the service area, such as leaving the home to go to study group, another notice (e.g., response 152) can be sent to Homeowner that the child's phone has left the service area of the APR component 110. Moreover, where another child of Homeowner also has a cell phone, notifications (e.g., response 152) can be sent to Homeowner about the second phone entering and leaving the service area of the APR component 110. This simple non-limiting example can provide a working parent a convenient way of knowing when a child comes home from school, etc.

Similar examples can be presented for numerous other circumstances, such as, notifying a shopkeeper of the arrival of a customer, notification of an employer of the arrival/departure of an employee, etc. Further, in some embodiments, system 100 can provide additional layers of security, for example, where a protective order is in place, an APR component 110 can alert (e.g., response 152) a petitioner to the presence of a potentially dangerous situation. One example of this can be that an APR component 110 at a place of work can notify a woman at work that her abusive ex-husband is at her place of work (e.g., response 152), giving her precious extra time to avert a potentially disastrous confrontation. Further, system 100 can notify both the woman and law enforcement contemporaneously (e.g., response 152). Moreover, the presence of the ex-husband, or at least a mobile device associated with him, can be recorded in an objective manner that can illustrate a time, date, and location (e.g., within the service area of the APR component 110). Notification can also be sent (e.g., response 152) to the ex-husband such that, where the intrusion by the ex-husband is unintentional, he can remedy the situation. Further, where the response (e.g., response 152) can be conditioned on the lookup information related to the IDI 122, even where the ex-husband has a "new" mobile IDI 122, the response (e.g., response 152) can still be sent to the woman because the new IDI 122 can still be associated with the ex-husband, such as by a name on a subscriber agreement, etc., thus reducing the ease of circumventing the system.

Figure 2:
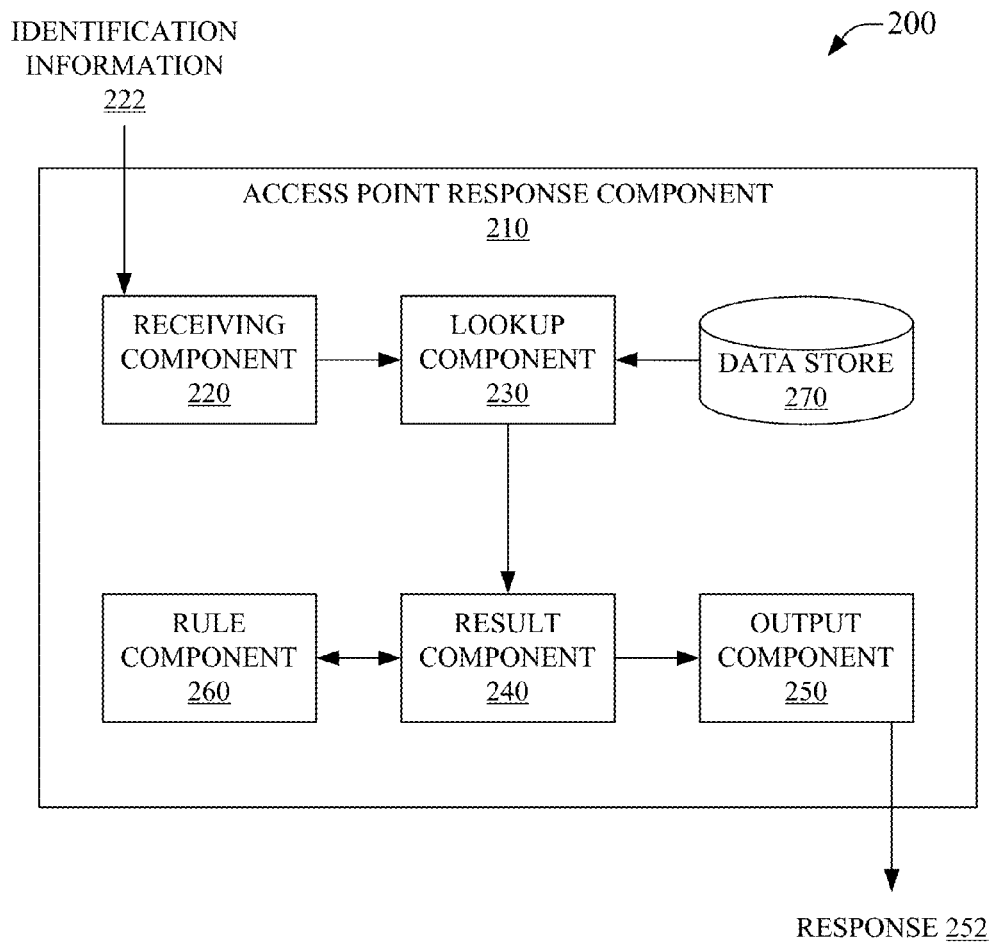
FIG. 2 is a depiction of a system that facilitates access to an automatic response to a localized input in accordance with aspects of the subject disclosure.

FIG. 2 is a depiction of a system 200 that can facilitate access to an automatic response to a localized input in accordance with aspects of the subject disclosure. System 200 can include APR component 210 that can receive IDI 222 from a mobile device (not illustrated). APR component 210 can include a receiving component 220. Receiving component 220 can be configured to receive IDI 222. Receiving component 220 can be communicatively coupled to lookup component 230. Lookup component 230 can be configured to receive information related to IDI 222. Lookup component 230 can be communicatively coupled to data store 270. Data store 270 can be local, remote, or distributed, and can be a repository for information related to IDI 222. As such, information related to IDI 222 can be received by lookup component 230 from data store 270.

APR component 210 can further include result component 240. Result component can be communicatively coupled to lookup component 230. Result component 240 can automatically determine a response 252 related to an IDI 222 received at receiving component 220. Result component 240 can be communicatively coupled to rule component 260. Rule component 260 can facilitate receiving at least one rule at result component 240. The automatically determined response 252 of result component 240 can be based on an IDI 222, information associated with the IDI 222, or a rule received from rule component 260. Result component 240 can be communicatively coupled to output component 250. Output component 250 can be configured to facilitate access to an automatically determined response 252 from result component 240.

In some embodiments, rule component 260 can facilitate receiving rules related to an IDI 222, such as IDI 222 received at receiving component 220. Further, in some embodiments rule component 260 can include a rule engine (not illustrated) to facilitate generating rules. These generated rules can be related to an IDI 222 received at receiving component 220. Moreover, rule component 260 can be coupled to a local, remote, or distributed data store (not illustrated). Examples of rules can include, but are not limited to, sending a response (e.g., 252) based on a class of identifier, sending a response (e.g., 252) based on an identified person related to an IDI (e.g., 222), sending a response (e.g., 252) based on a length of time an IDI source is within an area, prioritizing a response (e.g., 252) based on an IDI (e.g., 222) or condition, delaying a response (e.g., 252) based on an IDI (e.g., 222) or condition, etc. Numerous other rules are not explicitly illustrated for brevity but are to be considered within the scope of the subject disclosure.

As a more detailed non-limiting example of rules, an IDI 222 can be identified as belonging to Child. Child can enter the service area of the APR component 210. A rule received by result component 240, from rule component 260, can indicate that a response (e.g., 252) is to be sent to Parent only when Child has been in the service area of the APR component 210 for at least 5 minutes. A second rule can indicate that a response (e.g., 252) is to be sent to Parent when Child leaves the service area after having been in the service area for more than 10 minutes. Thus, where Child forgets their lunch on the way to school and runs back into the house (i.e., the service area) to grab the sack lunch and leave again in less than 5 minutes, a response (e.g., 252) is not sent to Parent. However, when Child returns home (i.e., the service area) after school and is there more than five minutes, a response (e.g., 252) can be sent to Parent indicating that Child is home. Further, where Child is home for 10 minutes and then gets a call from a friend to go for a walk, when Child leaves the house (i.e., the service area), a response (e.g., 252) can be sent to Parent notifying them that Child has left.

Figure 3:
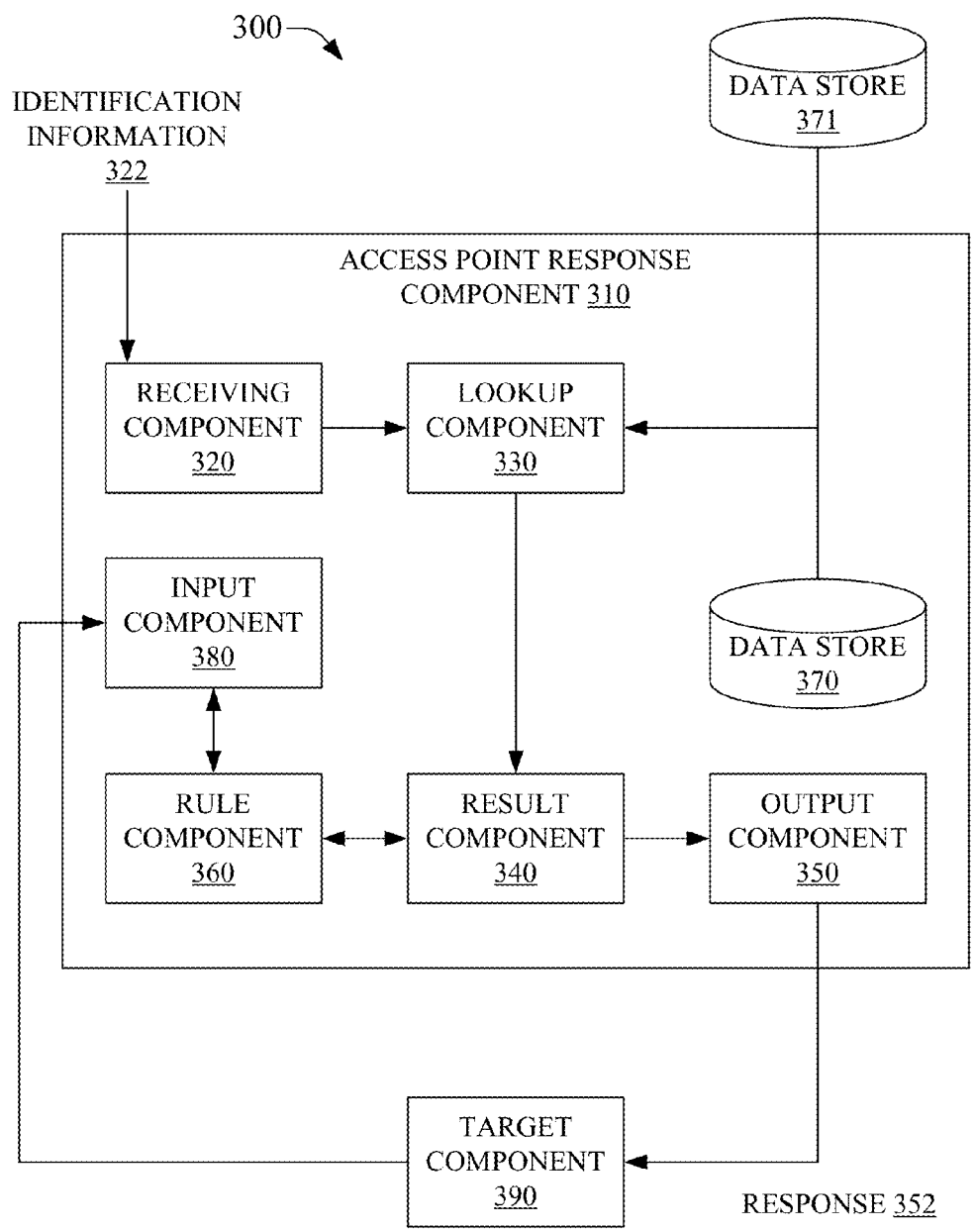
FIG. 3 illustrates a system that facilitates access to an automatic response to a localized input in accordance with the disclosed subject matter.

FIG. 3 illustrates a system 300 that facilitates access to an automatic response to a localized input in accordance with the disclosed subject matter. System 300 can include APR component 310 that can receive IDI 322 from a mobile device. APR component 310 can include a receiving component 320. Receiving component 320 can be configured to receive IDI 322. Receiving component 320 can be communicatively coupled to lookup component 330. Lookup component 330 can be configured to receive information related to IDI 322. Lookup component 330 can be communicatively coupled to data store 370 or 371. Data store 370 or 371 can be local, remote, or distributed, and can be repositories for information related to IDI 322. As such, information related to IDI 322 can be received by lookup component 330 from data store 370 or 371.

APR component 310 can further include result component 340. Result component can be communicatively coupled to lookup component 330. Result component 340 can automatically determine a response 352 related to an IDI 322 received at receiving component 320. Result component 340 can be communicatively coupled to rule component 360. Rule component 360 can facilitate receiving at least one rule at result component 340. The automatically determined response 352 of result component 340 can be based on an IDI 322, information associated with the IDI 322, or a rule received from rule component 360. Result component 340 can be communicatively coupled to output component 350. Output component 350 can be configured to facilitate access to an automatically determined response 352 from result component 340.

In some embodiments, rule component 360 can facilitate receiving rules related to an IDI, such as IDI 322 received at receiving component 320. Further, in some embodiments rule component 360 can include a rule engine (not illustrated) to facilitate generating rules. These generated rules can be related to an IDI 322 received at receiving component 320. Moreover, rule component 360 can be coupled to a local, remote, or distributed data store (not illustrated). Further, rule component can be communicatively coupled to input component 380.

Input component 380 can be communicatively coupled to target component 390. Target component 390 can be embodied in any appropriately configured target device. A target device can be a cell phone, a tablet computer, a laptop, a personal computer, a pager, a vehicle computer, etc. Further, a target device can include legacy devices and technologies such as a cell phone enabled to receive a text message, voicemail, push alert, specific ringtone or ringtone pattern, etc. Numerous other target devices and technologies are not explicitly illustrated for brevity but are to be considered within the scope of the subject disclosure. Target component 390 can be communicatively coupled to output component 350.

In some embodiments, input component 380 can facilitate interaction between target component 390 and rule component 360. This can facilitate dynamically adapting rules or rule selection parameters. Further, this can facilitate generation of new rules or deletion of rules. As a non-limiting example, target component 390 can indicate that a rule relating to an IDI (e.g., 322) for Child is to be added, deleted or modified. As a second non-limiting example, target component 390 can indicate that no responses (e.g., 352) are to be generated during a predetermined time window, such as a meeting, etc. Numerous other interactions by way of input component 380 are not explicitly illustrated for brevity but are to be considered within the scope of the subject disclosure.

Figure 4:
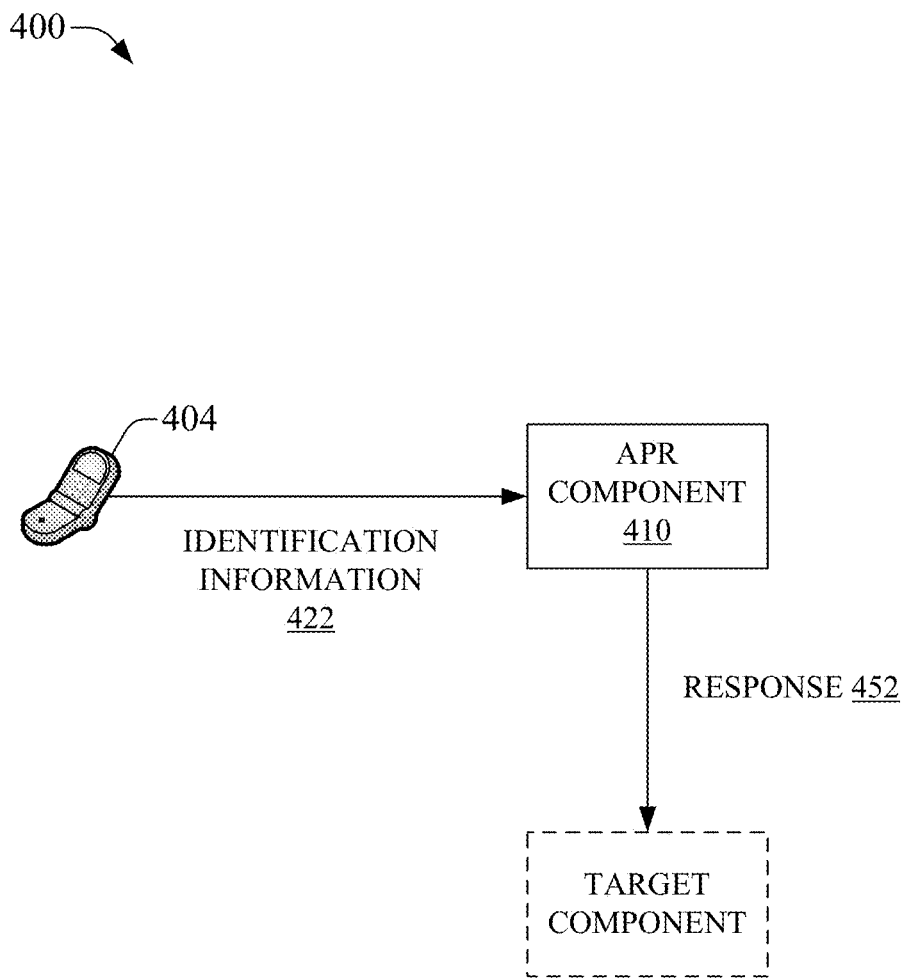
FIG. 4 is a depiction of a system that facilitates access to an automatic response to a localized input in accordance with aspects of the subject disclosure.

FIG. 4 is a depiction of a system 400 that facilitates access to an automatic response to a localized input in accordance with aspects of the subject disclosure. System 400 can include an IDI source 404, such as, but not limited to, cell phone, pager, laptop computer, tablet computer, smartphone, etc. System 400 can further include APR component 410. IDI source 404 can transmit an IDI 422 that can be received by APR component 410. As a non-limiting example, a cell phone or smartphone can transmit SIM or eSIM identifiers (e.g., IDI 422) to register with wireless communications system equipment, such as a NodeB, Femtocell, microcell, picocell, etc. The exemplary SIM/eSIM identifiers (e.g., IDI 422) can be received by APR component 410 to facilitate determining a response 452. For example, where IDI source 404 enters the service area of APR component 410, the IDI 422 can be employed to send a response 452 to a target component.

Figure 5:
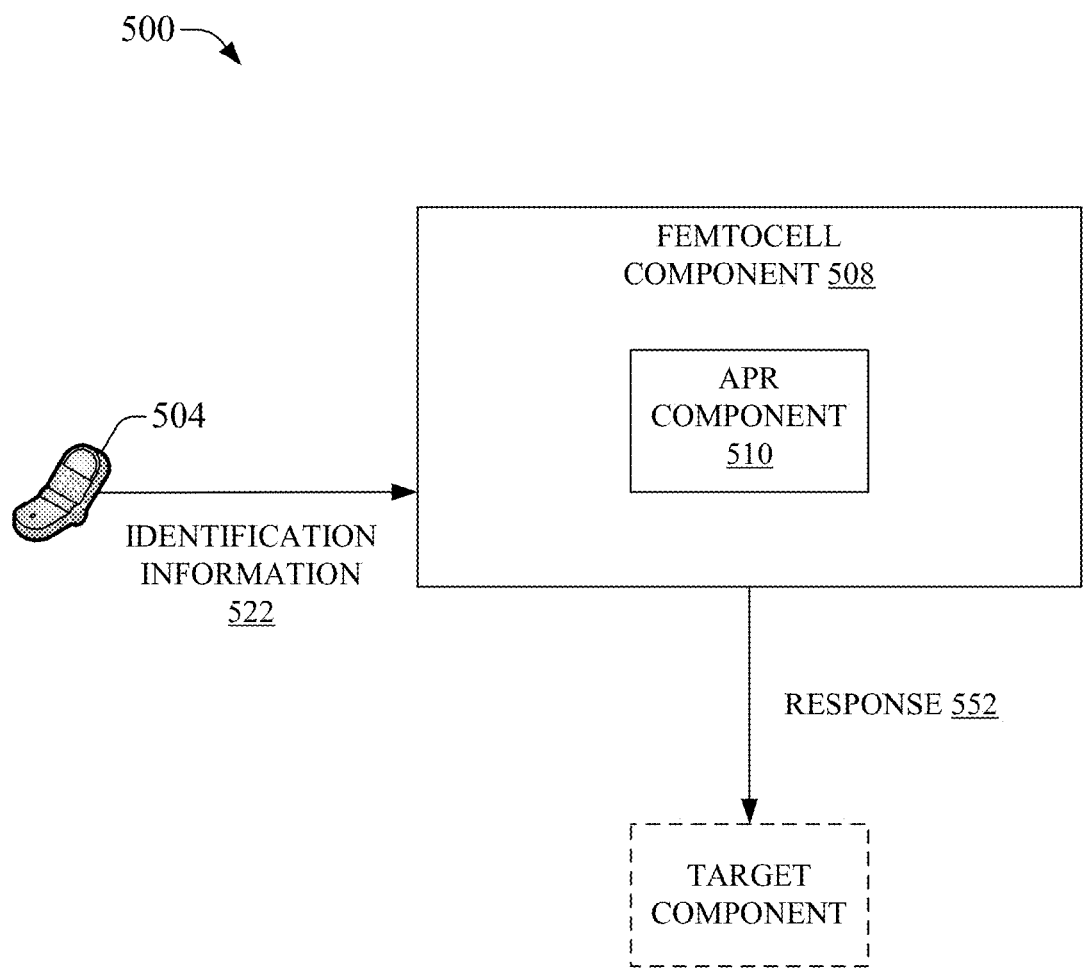
FIG. 5 illustrates a system that can facilitate access to an automatic response to a localized input received by a femtocell in accordance with the disclosed subject matter.

FIG. 5 illustrates a system 500 that can facilitate access to an automatic response to a localized input received by a femtocell in accordance with the disclosed subject matter. System 500 can include an IDI source 504, such as, but not limited to, cell phone, pager, laptop computer, tablet computer, smartphone, etc. System 500 can further include APR component 510. APR component 510 can be included in femtocell component 508. Femtocell component 508 can be a small cellular base station, typically designed for use in a home or small business. Femtocell 508 can connect a service provider network to mobile phones (e.g., IDI sources 504) in a residential setting or enterprise setting. Femtocell 508 can facilitate extending cellular service coverage indoors. Femtocell 508 can employ any appropriate wireless communications standard, such as Global System for Mobile Communication (GSM), long-term evolution (LTE) solutions, etc. IDI source 504 can transmit an IDI 522 that can be received by femtocell 508 including APR component 510. Femtocell 508 can facilitate access to a response 552 generated by APR component 510. For example, femtocell 508 can transmit a response 552 based on an IDI 522, IDI 522 received from IDI source 504, to a target component.

Figure 6:
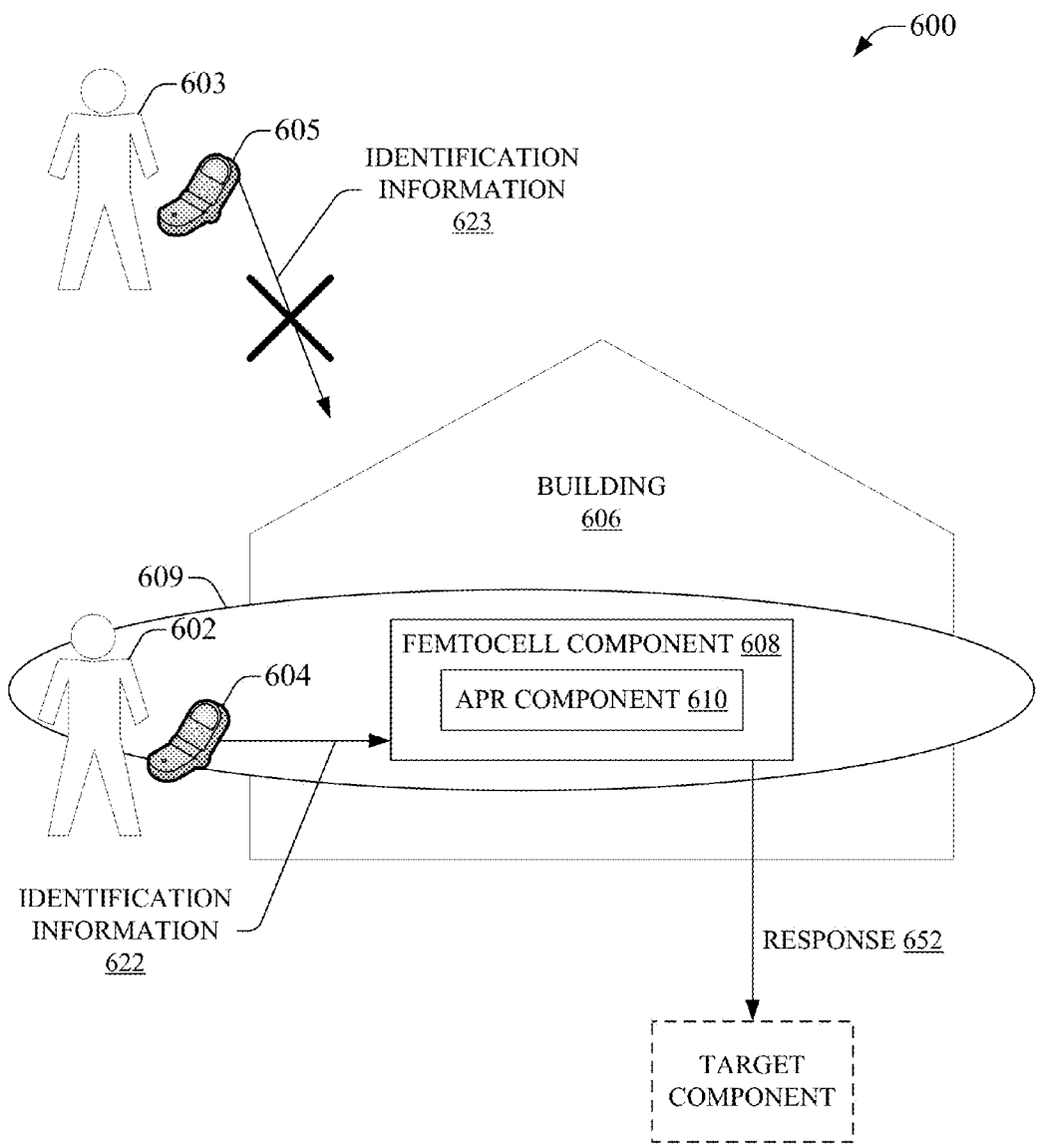
FIG. 6 is a diagram of an exemplary non-limiting system that facilitates access to an automatic response to a localized input for a building in accordance with aspects of the subject disclosure.

FIG. 6 is a diagram of an exemplary non-limiting system 600 that facilitates access to an automatic response to a localized input for a building in accordance with aspects of the subject disclosure. System 600 can include Person 602 having cell phone 604 and Person 603 having cell phone 605. It is to be noted that this example employs cell phones 604 and 605 as IDI sources merely for ease of comprehension and that any IDI source could be substituted without departing from the scope of the subject disclosure, such as cell phone 604 could just as easily be a tablet computer, smartphone, pager, laptop computer, etc.

System 600 can further include building 606. Building 606 can be any building, such as a residential home, an apartment, a condominium, a commercial building, an office, a shop, a factory, etc. Building 606 is presented merely to illustrate one possible context or use of the subject disclosure and should not be considered limiting to the subject disclosure, which is equally capable of being deployed without any building at all. Building 606 can include femtocell component 608 having a service area of 609. Femtocell component 608 can include APR component 610. The service area of femtocell component 608 can be the same as the service area of APR component 610.

The service area 609 can be substantially more granular than conventional cellular phone networks. That is, service area 609 can typically be associated with a limited geographical area. Further, in some embodiments, service area 609 can be tuned to adjust the size, shape, and location of service area 609 to match or approximate a predetermined geographic area. For example, service area 609 can include building 606 and areas near building 606. As a second example, service area 609 can be tuned to include an apartment and to exclude neighboring apartments or apartments above or below, for example by tuning the service area to be a "flattened sphere" with a circular or ovular cross section (e.g., an ellipsoid of the equation, $$\frac{x^2}{a^2} + \frac{y^2}{b^2} + \frac{z^2}{c^2} = 1,$$

wherein $a=b\neq c$ or $a\neq b\neq c$). As a third example, service area 609 can be tuned to include predetermined entrances to a shopping mall and to exclude other entrances to the shopping mall. Numerous other examples of adapting service area 609 to a particular size, shape, or location are not explicitly illustrated for brevity but are to be considered within the scope of the subject disclosure.

Wherein Person 602 with cell phone 604 enters service area 609, an IDI 622 can be received by APR component 610 from cell phone 604. In contrast, where Person 603 with cell phone 605 is beyond the service area 609, IDI 623 will not be received by ARP component 610. A response 652 to receiving the IDI 622 can be received by a target component, such as the personal computer of the owner of Building 606. As a non-limiting example, where building 606 is a residence and APR component 610 has been configured to notify Parent (e.g., target component is one or more devices of Parent) when Child (e.g., 602) returns home, where Child 602 returns home and enters service area 609 associated with home, an IDI 622 can be received at APR component 610 from Child's cell phone (e.g., 604) and a response 652, such as "Child Home" can be transmitted to Parent's cell phone and email account (e.g., target components). As a second non-limiting example, where service area 609 is associated with a ticketing counter at an airport terminal (e.g., a portion of airport terminal 606), when a ticket holder (e.g., Person 602) has registered a cell phone (e.g., 604) with the ticket and the ticket holder 602 arrives in the service area 609, the IDI 622 from the cell phone 604 can be searched against registered cell phones and a "passenger arrived" response (e.g., response 652) can be received by the airport ticketing computer (e.g., a target component). As a third non-limiting example, an emergency room can be covered by service area 609. Doctor and nurse pagers (e.g., IDI sources 604) can be registered with APR component 610 such that as doctors and nurses (e.g., Persons 602) come on and off duty (e.g., enter and leave the emergency room) a reader board (e.g., target component) can receive updates to display emergency room staffing information. Thus, for example, where a doctor 602 leaves the emergency room with a patient to take them to a hospital room, the reader board can update that the doctor 602 is not available and when she left the emergency room. Numerous other examples are not explicitly illustrated for brevity but are to be considered within the scope of the subject disclosure.

Figure 7:
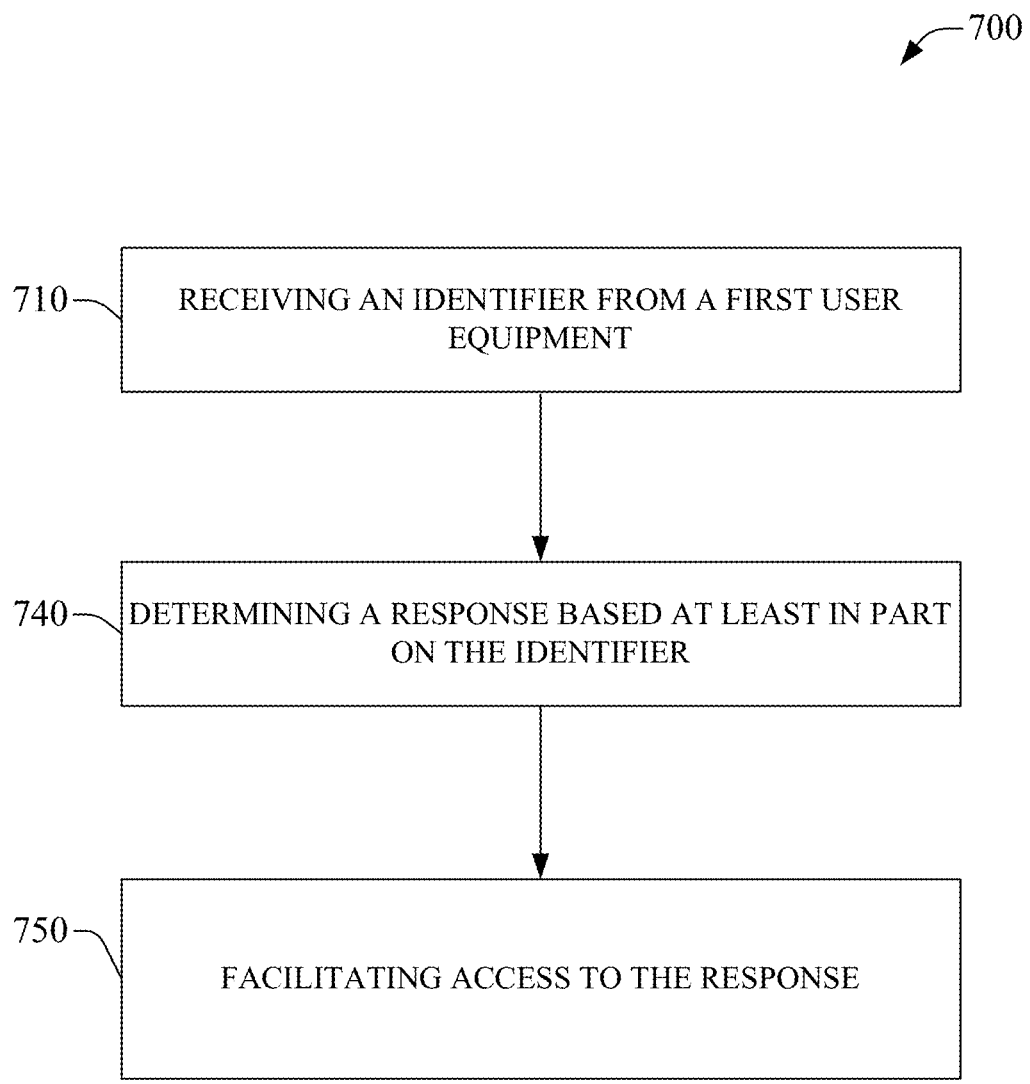
FIG. 7 illustrates aspects of a method facilitating access to an automatic response to a localized input in accordance with aspects of the subject disclosure.
Figure 8:
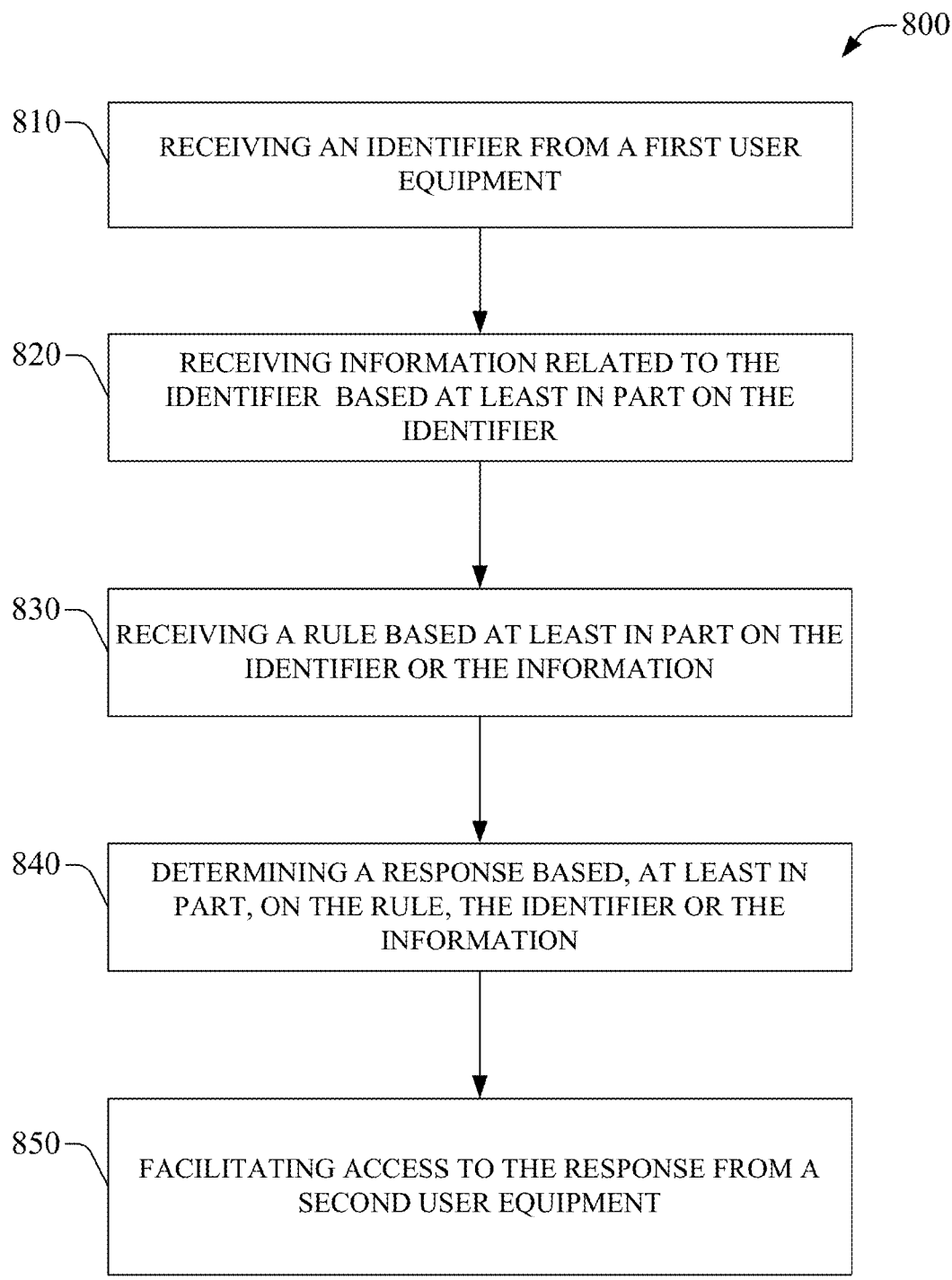
FIG. 8 illustrates aspects of a method facilitating access to an automatic response to a localized input in accordance with aspects of the subject disclosure.
Figure 9:
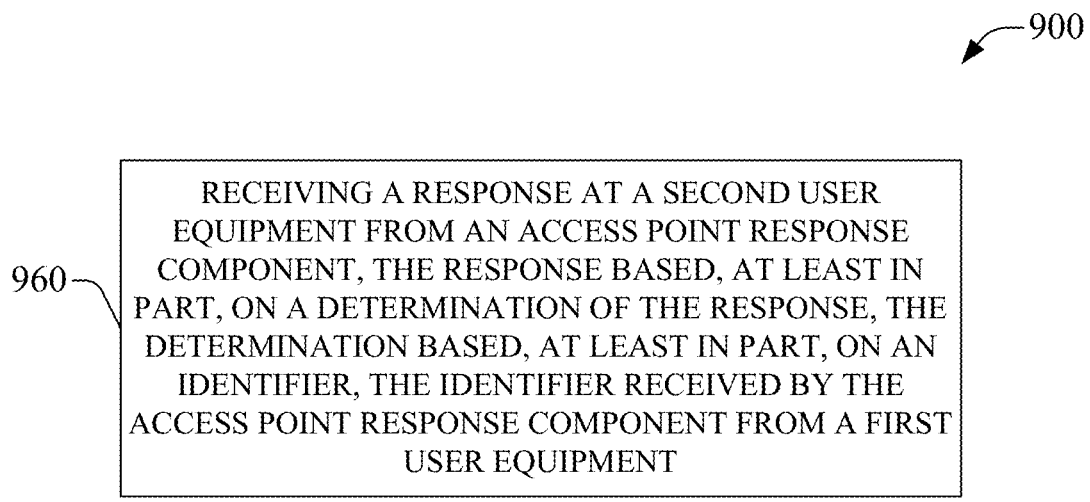
FIG. 9 illustrates a method for receiving an automatic response to a localized input in accordance with aspects of the subject disclosure.

In view of the example system(s) described above, example method(s) that can be implemented in accordance with the disclosed subject matter can be better appreciated with reference to flowcharts in FIG. 7-FIG. 9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates aspects of a method 700 facilitating access to an automatic response to a localized input in accordance with aspects of the subject disclosure. At 710, method 700 can receive an identifier from a first user equipment. The first user equipment can be nearly any user device that makes identifiable information available to be received. The first user equipment can include a cell phone, smartphone, pager, laptop computer, tablet computer, vehicle computer, etc. The identifier can be an IDI, and can include nearly any type of identifier, such as a subscriber identity module (SIM) identifier, an electronic SIM (eSIM)

identifier, an internet protocol (IP) address, a Media Access Control (MAC) address, a phone number, a password, a user id, e.g., a user id to log into a computer system, a website, a service, etc., a personal identification number (PIN), etc. Numerous other examples are not explicitly recited for brevity but are to be considered within the scope of the present disclosure.

At 740, a response can be determined based on the identifier received. As a non-limiting example, where a tablet computer MAC address is received, a response can indicate that that the MAC address was received. At 750, access to the determined response can be facilitated. As a non-limiting example, the response that the MAC address was received can be accessed from a remote personal computer. Numerous other examples are not explicitly recited for brevity but are to be considered within the scope of the present disclosure. At this point method 700 can end. Generally, method 700 can be associated with a particular service area, such that receiving an identifier is associated with receiving said identifier in a particular service area. Further, the service area can be related to a target of any determined response, such as a home service area belonging to an owner of a cell phone that is a target of automatically generated responses. As a non-limiting example, method 700 can be employed in a femtocell deployed in Subscriber's home. Subscriber's spouse can have a cell phone with a SIM. A response can be determined and sent to Subscriber, such as by text message, when the cell phone of spouse enters the service area of Subscriber's femtocell.

FIG. 8 illustrates aspects of a method 800 facilitating access to an automatic response to a localized input in accordance with aspects of the subject disclosure. At 810, method 800 can receive an identifier from a first user equipment. The first user equipment can include a cell phone, smartphone, pager, laptop computer, tablet computer, vehicle computer, etc. The identifier can be an IDI, and can include nearly any type of identifier, such as a subscriber identity module (SIM) identifier, an electronic SIM (eSIM) identifier, an internet protocol (IP) address, a Media Access Control (MAC) address, a phone number, a password, a user id, e.g., a user id to log into a computer system, a website, a service, etc., a personal identification number (PIN), etc. Numerous other examples are not explicitly recited for brevity but are to be considered within the scope of the present disclosure.

At 820, information related to the identifier received at 810 can be received. The identifier received at 810 can be employed to lookup, access, or receive information relating to the identifier. As a non-limiting example, where a SIM identifier is received, an associated telephone number can be accessed from a subscriber account for the SIM, etc. Numerous other examples are not explicitly recited for brevity but are to be considered within the scope of the present disclosure.

At 830, a rule can be received based, at least in part, on the identifier received at 810 or the information received at 820. Either the identifier or the information can facilitate receiving one or more rules relating to determining a response to receiving the identifier at 810. As a non-limiting example, a rule can be accessed based on a SIM or a phone number associated with a SIM. Numerous other examples are not explicitly recited for brevity but are to be considered within the scope of the present disclosure.

At 840, a response can be determined based, at least in part, on the identifier, the information, or the rule received. As a non-limiting example, where a laptop computer static IP address is received, a response can be generated that indicates that that the laptop computer is in the service area. At 850, access to the determined response can be facilitated for a second user equipment. Numerous other examples are not explicitly recited for brevity but are to be considered within the scope of the present disclosure. At this point method 800 can end.

FIG. 9 illustrates a method 900 for receiving an automatic response to a localized input in accordance with aspects of the subject disclosure. At 960, method 900 can receive a response at a second user equipment. The response can be based, at least in part on a received identifier, information related to the identifier, or rule related to the identifier or the information. The identifier can be received from a first user equipment. At this point method 900 can end.

An identifier can be received from a first user equipment. The first user equipment can include a cell phone, smartphone, pager, laptop computer, tablet computer, vehicle computer, etc. The identifier can be an IDI, and can include nearly any type of identifier, such as a SIM identifier, eSIM identifier, an IP address, a MAC address, a phone number, a password, a user id, e.g., a user identifier to log into a computer system, a website, a service, etc., a PIN, etc. Numerous other examples are not explicitly recited for brevity but are to be considered within the scope of the present disclosure.

Information related to the identifier can also be received. An identifier can be employed to lookup, access, or receive information relating to the identifier. A rule can be received based, at least in part, on the identifier or the information. Either the identifier or the information can facilitate receiving one or more rules relating to determining a response to receiving the identifier. A response can be determined based, at least in part, on the identifier, the information, or the rule received. Access to the determined response can be facilitated from a second user equipment. At 960, a second user equipment can receive the response.

Figure 10:
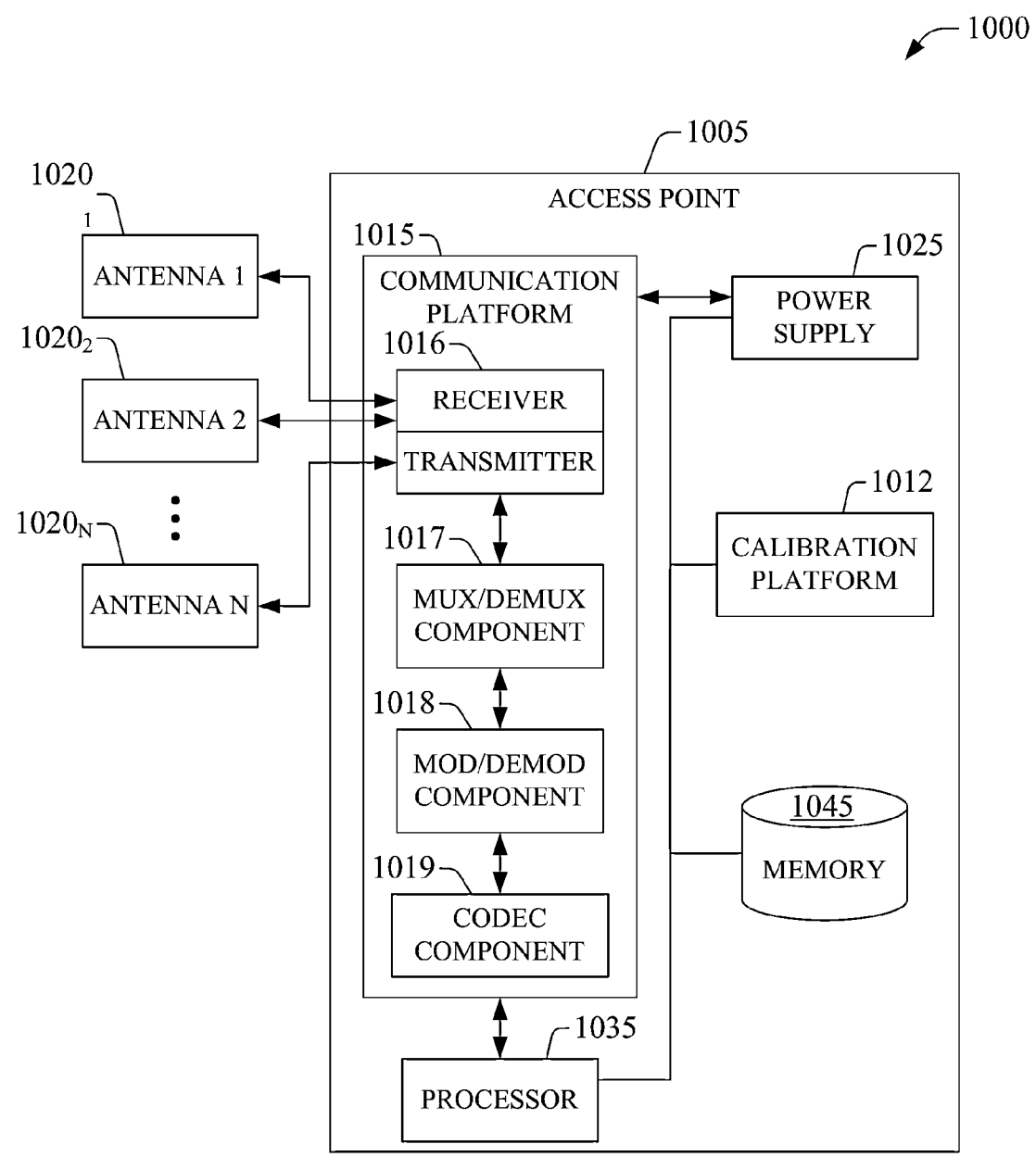
FIG. 10 illustrates a block diagram of an exemplary embodiment of an access point to implement and exploit one or more features or aspects of the subject disclosure.

FIG. 10 illustrates a block diagram of an example embodiment of an access point to implement and exploit one or more features or aspects of the subject innovation. Access point 1000 can be part of a communications framework, for example, a femtocell (e.g., 508, 608), a microcell, a picocell, a router, a wireless router, etc. In embodiment 1000, AP 1005 can receive and transmit signal(s) (e.g., attachment signaling) from and to wireless devices like femtocell access points, access terminals, wireless ports and routers, or the like, through a set of antennas $1020_1$-$1020_N$ (N is a positive integer). It can be noted that antennas $1020_1$-$1020_N$ can be part of communication platform 1015, which comprises electronic components and associated circuitry that provides for processing and manipulation of received electromagnetic signal(s) and electromagnetic signal(s) to be transmitted. Such electronic components and circuitry embody, at least in part, can comprise signaling and traffic components within a communication framework. In some embodiments, communication platform 1015 can include a receiver/transmitter 1016 that can convert signal from analog to digital upon reception, and from digital to analog upon transmission. In addition, receiver/transmitter 1016 can divide a single data stream into multiple, parallel data streams, or perform the reciprocal operation. Coupled to receiver/transmitter 1016 is a multiplexer/demultiplexer 1017 that facilitates manipulation of signal in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information (e.g., codes) according to substantially any code known in the art; e.g., Hadamard-Walsh codes, Baker codes, Kasami codes, polyphase codes, and so on. A modulator/demodulator 1018 is also a part of communication platform 1015, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1015 also includes a coder/decoder (codec) component 1019 that facilitates decoding received signal(s), and coding signal(s) to convey.

Access point 1005 can also include a processor 1035 configured to confer functionality, at least in part, to substantially any electronic component in AP 1005. Power supply 1025 can attach to a power grid and include one or more transformers to achieve a power level that can operate AP 1005 components and circuitry. Additionally, power supply 1025 can include a rechargeable power component to ensure operation when AP 1005 is disconnected from the power grid, or in instances, the power grid is not operating.

Processor 1035 also is functionally connected to communication platform 1015 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1035 is functionally connected, via a data or system bus, to calibration platform 1012 and other components (not shown) to confer, at least in part functionality to each of such components.

In AP 1005, memory 1045 can store data structures, code instructions and program modules, system or device information, code sequences for scrambling, spreading and pilot transmission, location intelligence storage, determined delay offset(s), over-the-air propagation models, and so on. Processor 1035 is coupled to the memory 1045 in order to store and retrieve information necessary to operate and/or confer functionality to communication platform 1015, calibration platform 1012, and other components (not shown) of access point 1005.

Figure 11:
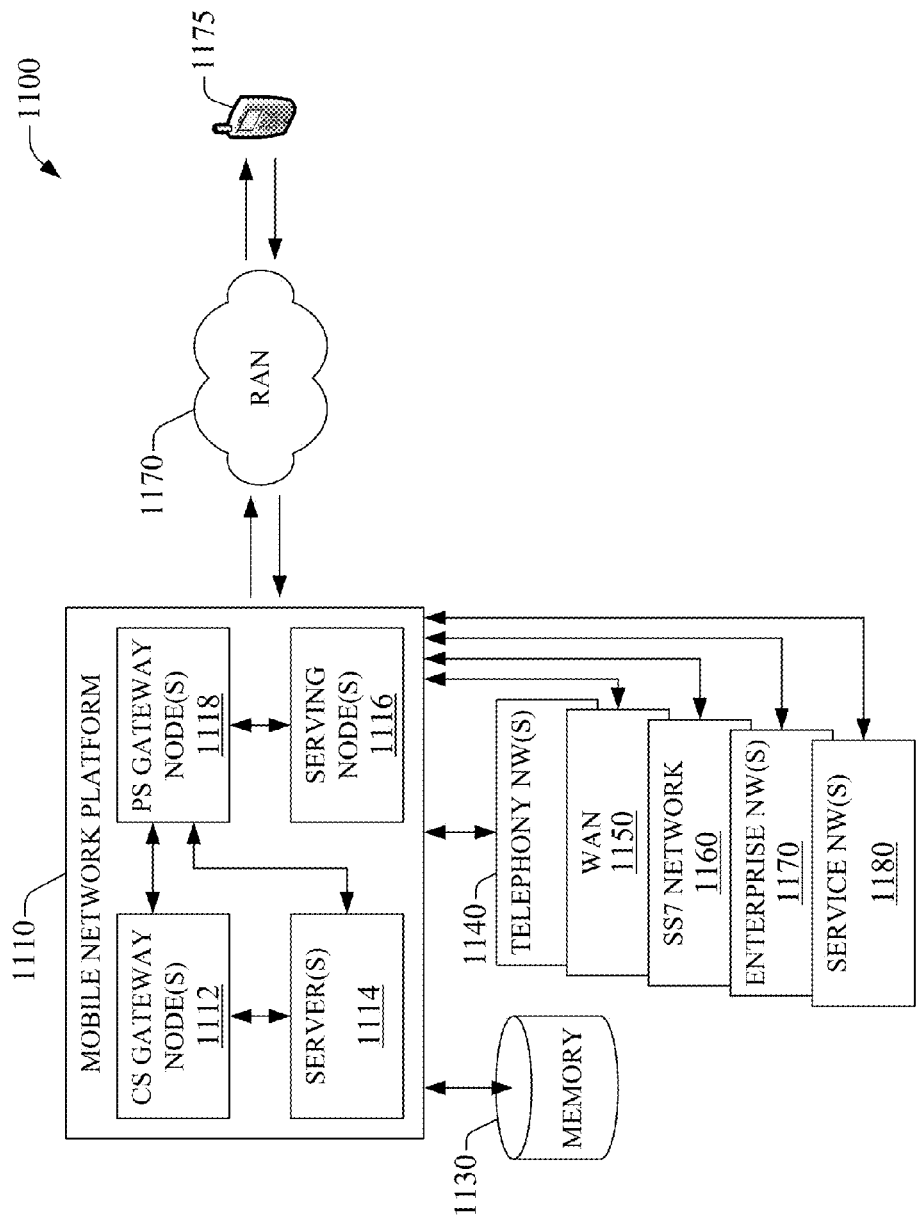
FIG. 11 is a block diagram of an exemplary embodiment of a mobile network platform to implement and exploit various features or aspects of the subject disclosure.

FIG. 11 presents an example embodiment 1100 of a mobile network platform 1110 that can implement and exploit one or more aspects of the subject innovation described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications (e.g., location services, online gaming, wireless banking, wireless device management, IDI response, . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content (s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server (s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS)

network(s) (not shown). Provisioning server(s) can also provision coverage through networks associated to wireless network platform 1110 (e.g., deployed and operated by the same service provider), such as femtocell network(s) (not shown, e.g., 508, 608) that enhance wireless service coverage within indoor confined spaces and offload RAN resources in order to enhance subscriber service experience within a home or business environment.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of an data store component (e.g., 270, 370, etc.) or as a remotely connected memory store (e.g., 371, etc.), such stored information can be accessed by APR components (e.g., 210, 310, etc.).

Figure 12:
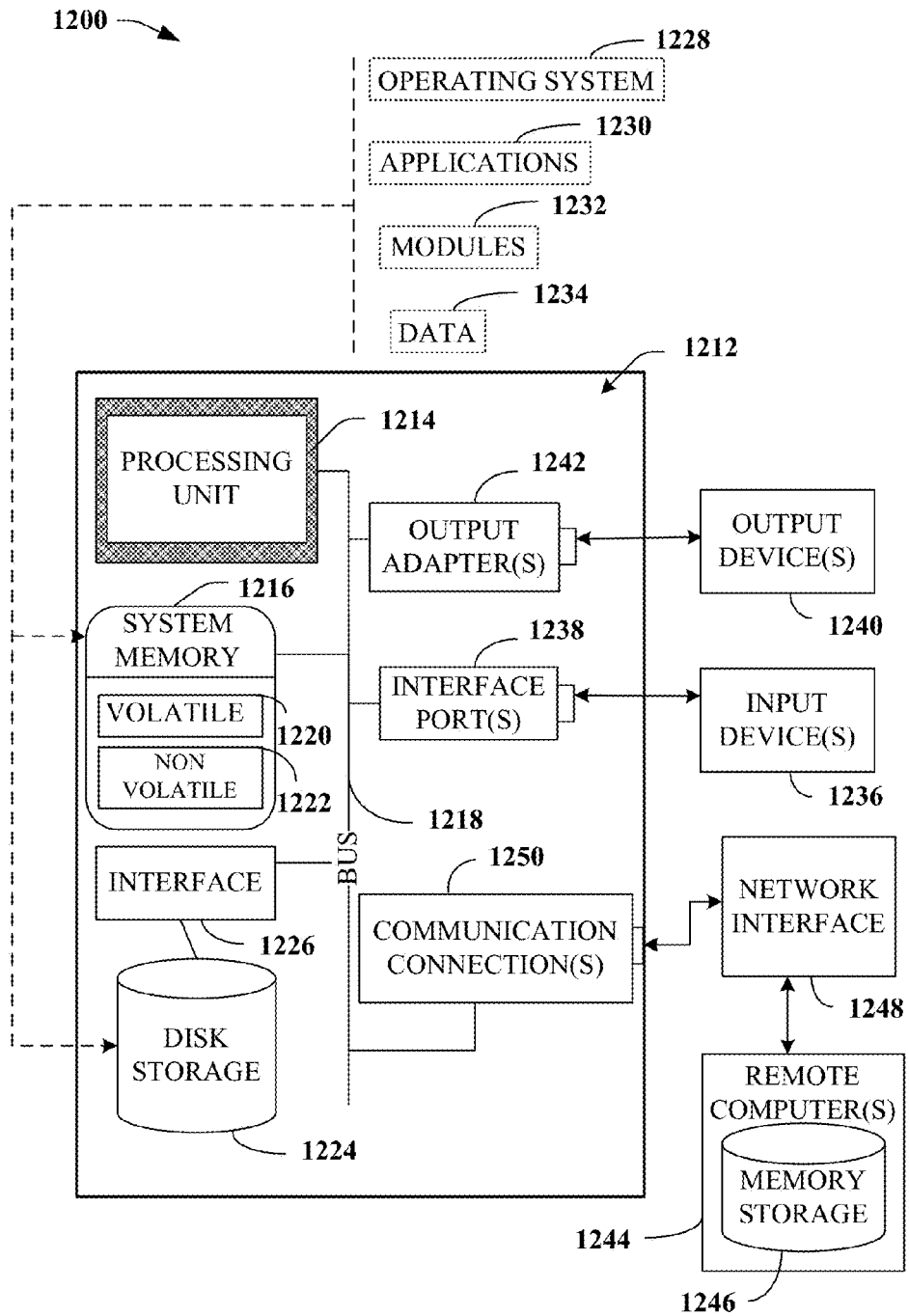
FIG. 12 illustrates a block diagram of a computing system operable to execute the disclosed systems and methods in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in APR component 210, 310, etc., memory 1045, memory 1130, non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, those skilled in the art will appreciate that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212 (which can be, for example, part of the hardware of a femtocell (e.g., 508, 608, etc.), APR component (e.g., 110, 210, etc.), . . . ) includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information, e.g., by way of a mobile device such as a cell phone, smartphone, tablet computer, etc., into computer 1211 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UTMS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rate for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving proximity information related to a proximity of a first user equipment to an access point device;
receiving account information associated with the first user equipment in response to the first user equipment being determined to satisfy a temporal rule related to an elapsed time during which the first user equipment is determined to have satisfied a boundary condition with respect to a zone corresponding to a service area of the access point device;
receiving consumer identification information based on the account identification information;
determining, in response to the consumer identification information satisfying an identity condition of an identity rule, notification information based on the proximity information, wherein the rule measures a level of similarity between configurable consumer identity information and the account information; and
facilitating access to the notification information by a second user equipment.

2. The system of claim 1, wherein the boundary condition relates to the first user equipment transitioning the zone corresponding to the service area of the access point device.

3. The system of claim 1, wherein the boundary condition relates to a time that the first user equipment has been determined to have occupied the zone corresponding to the service area of the access point device.

4. The system of claim 1, wherein the boundary condition relates to a number of times the first user equipment has been determined to have transitioned the zone corresponding to the service area of the access point device.

5. The system of claim 1, wherein the operations further comprise determining a notification priority based on the consumer identification information.

6. The system of claim 5, wherein the operations further comprise facilitating access to the notification information for a third user equipment based on the notification priority.

7. The system of claim 6, wherein the facilitating the access of the notification information by the second user equipment comprises selecting a process from defined processes for access of information of the system based on the notification priority.

8. The system of claim 7, wherein the defined processes comprise electronic messaging.

9. The system of claim 7, wherein the defined processes comprise email messaging.

10. The system of claim 7, wherein the defined processes comprise telephone calling.

11. The system of claim 7, wherein the defined processes comprise interaction via a web site hosted by a web site server device.

12. The system of claim 1, wherein the identity rule relates to determining that a portion of the account information matches another portion of the configurable consumer identification information.

13. The system of claim 12, wherein the portion of the account information comprises a variation of a spelling of a name associated with the other portion of the configurable consumer identification information.

14. A method, comprising:
receiving, by a device comprising a processor, proximity information related to a proximity of a first user equipment to an access point device;
receiving, by the device, account information associated with the first user equipment in response to the first user equipment being determined to have satisfied a temporal rule related to an elapsed time over which the first user equipment is determined to satisfy a boundary condition with respect to a zone corresponding to a service area of the access point device;
receiving, by the device, consumer identification information based on the account identification information;
determining by the device, in response to the consumer identification information being determined to have satisfied an identity condition of an identity rule, notification priority information based on the proximity information, wherein the rule determines corresponding information between a consumer profile associated with configurable consumer identity information and the account information; and
facilitating, by the device, access to notification information by a second user equipment based on the notification priority information.

15. The method of claim 14, wherein the receiving the account information is in response to the first user equipment being determined to have transitioned the zone corresponding to the service area of the access point device.

16. The method of claim 14, wherein the receiving the account information is in response to the first user equipment being determined to occupy the zone corresponding to the service area of the access point device for a defined period of time.

17. The method of claim 14, wherein the receiving the consumer identification information comprises determining that a first portion of the account information matches a second portion of the consumer profile.

18. The method of claim 17, wherein the first portion of the account information comprises a variation of a spelling of a name associated with the second portion of the consumer profile.

19. A device, comprising:
a processor; and
a memory that stores executable instructions that, when executed by the processor, facilitate performance of operations, comprising:
receiving proximity information related to a proximity of a first user equipment to an access point device;
receiving account information associated with the first user equipment in response to the first user equipment being determined to have satisfied a temporal rule related to an elapsed time according to which the first user equipment is determined to satisfy a boundary condition with respect to a zone corresponding to a service area of the access point device;
receiving consumer identification information based on a portion of the account identification information being determined to be same as another portion of a consumer profile associated with the consumer identification information;

in response to the consumer identification information satisfying an identity condition of an identity rule, determining notification priority information based on the proximity information, wherein the rule relates to configurable consumer identity information; and facilitating access to notification information by a second user equipment based on the notification priority information.

20. The mobile device of claim 19, wherein the facilitating the access comprises selecting a technology, based on the notification priority information, from technologies related to accessing the notification information by the second user equipment.

* * * * *